No. 712,568. Patented Nov. 4, 1902.
W. M. MURPHY.
CABLE JOINT.
(Application filed Jan. 13, 1902.)
(No Model.)

WITNESSES:
Edward Thorpe
P. B. Owens.

INVENTOR
William M. Murphy
BY
ATTORNEYS

UNITED STATES PATENT OFFICE.

WILLIAM M. MURPHY, OF NEW YORK, N. Y., ASSIGNOR OF ONE-HALF TO ORVILLE R. HAYES, OF BOSTON, MASSACHUSETTS, AND JOSIAH F. GOODING, OF BROOKLINE, MASSACHUSETTS.

CABLE-JOINT.

SPECIFICATION forming part of Letters Patent No. 712,568, dated November 4, 1902.

Application filed January 13, 1902. Serial No. 89,513. (No model.)

*To all whom it may concern:*

Be it known that I, WILLIAM M. MURPHY, a citizen of the United States, and a resident of the city of New York, borough of Manhattan, in the county and State of New York, have invented a new and Improved Cable-Joint, of which the following is a full, clear, and exact description.

This invention relates to a means for joining the lead casing of submarine or other electric cables. When a cable is spliced, it is necessary to join the lead covering hermetically. This has heretofore been done by "wiping" a joint around it; but by means of my invention I am able to dispense with this process and effectively connect the covering.

This specification is an exact description of one example of my invention, while the claims define the actual scope thereof.

Reference is to be had to the accompanying drawings, forming a part of this specification, in which similar characters of reference indicate corresponding parts in both views.

Figure 1:
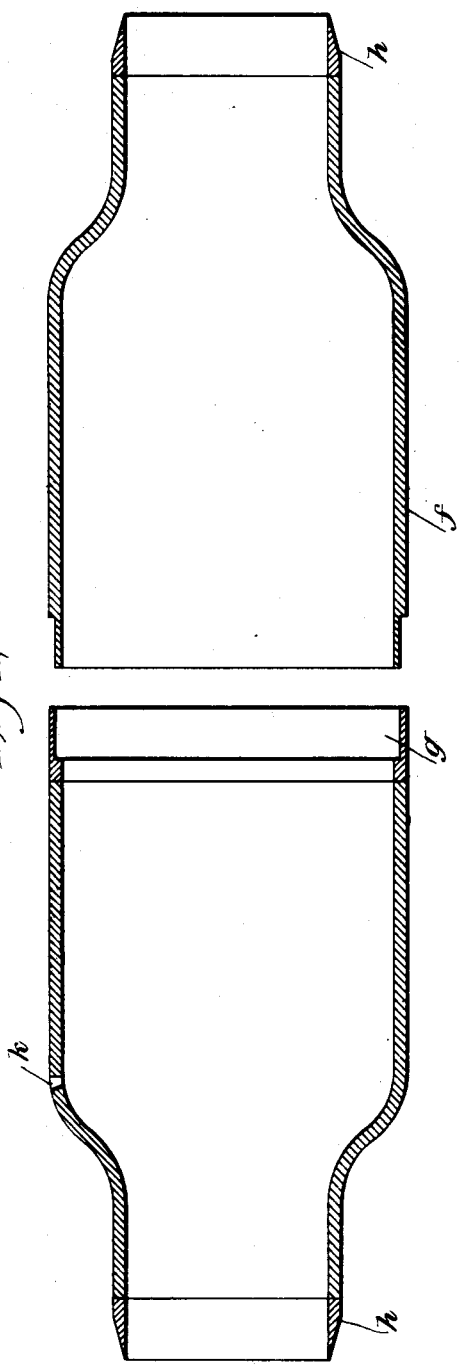
Figure 2:
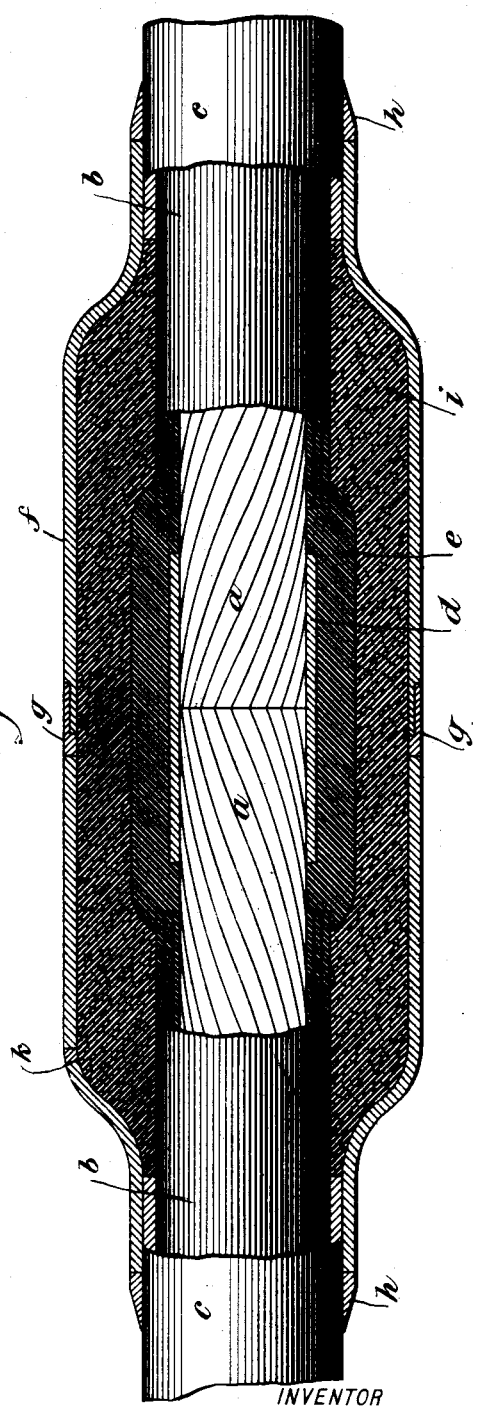

Figure 1 is a view of a jacket embodying my invention, and Fig. 2 is a view showing the jacket applied to the cable.

$a$ indicates the ends of the cable spliced together.

$b$ indicates the usual insulation, and $c$ indicates the lead covering.

$d$ indicates the copper sleeve which joins the cables together.

$e$ indicates the rubber compound which covers the sleeve and connects the break between the insulation $b$.

When the cable is spliced and the parts $d$ and $e$ are in place, a lead jacket $f$ is placed over the joint. This jacket $f$ may be formed in two sections, as shown, or, if desired, it may be made of one integral mass of material. Assuming that it is in two sections, the sections are placed on the respective ends of the cable and moved back from each other while the splicing operation is carried on. When this is finished, the two sections of the jacket are moved toward each other and engaged in the manner shown in Fig. 2.

$g$ indicates an annular mass of solder which is placed on the inner end of one section, so that the sections may be cemented together when connected. This section of solder is placed on the sleeve-section and forms a part thereof, and then when the two sections are joined the solder is melted and caused to set.

$h$ indicates annular sections of solder which are carried by the outer ends of the sleeve-sections in the same manner as the section $g$ of solder, and when the sleeve-sections are connected the solder $h$ should then be melted, so as to set on the lead covering $c$ and form a hermetic connection. When this has been effected, a mass of pitch $i$ is run into the jacket and lies around the insulation $b$ and $c$, as shown.

$k$ indicates an opening in the jacket through which this pitch is run, and when the space within the jacket is filled this opening $k$ should be closed with a body of solder or the like. In case the jacket is constructed in one part the annular section $g$, of solder, will be of course unnecessary, and the jacket should be of uniform diameter. This jacket should be placed on one part of the cable before the splice is made, and after the splice is made the jacket will be moved up into position to cover the splice, as before explained. Finally, the ends of the jacket should be reduced to fit snugly against the cable-covering $c$. In other respects the jacket is the same. Now it will be observed that this provides an effective covering for the splice and avoids wiping a joint, which operation requires a skilled mechanic and is in itself wasteful of both time and materials. The sleeve or jacket forming my invention may be readily slipped over the splice and soldered in place by inexperienced workmen.

In the claims the term "cementing material" is meant to cover solder or other means for joining or "cementing" the parts together.

Various changes in the form and details of my invention may be resorted to at will without departing from the spirit of my invention. Hence I consider myself entitled to all forms of the invention as may lie within the intent of my claims.

Having thus described my invention, I claim as new and desire to secure by Letters Patent—

1. A covering for the joints or splices of electric cables, comprising a jacket or sleeve capable of being fitted over and cemented to the covering of the cable, and a section of cementing material carried on the sleeve or jacket to permit cementing it in place.

2. A covering for the joints of electric or other cables, the covering comprising a jacket or sleeve formed in two sections, with a body of cementing material carried by one section, for the purpose specified.

3. A covering for the joints of electric or other cables, the covering comprising a jacket or sleeve formed in two sections, with a body of cementing material carried by one section, for the purpose specified, said body of cementing material being carried by the inner end of the section, and the outer end of each section also having a body of cementing material.

4. A covering for the joints or splices of electric cables, comprising a jacket or sleeve capable of being fitted over and cemented to the covering of the cable, and a section of cementing material carried on the sleeve or jacket to permit cementing it in place, the jacket having an orifice intermediate its ends, for the purpose specified.

5. A covering for the joints of electric or other cables, the covering comprising a jacket or sleeve formed in two sections with a body of cementing material carried on one section to permit cementing the two together, and one section having an orifice therein, for the purpose specified.

In testimony whereof I have signed my name to this specification in the presence of two subscribing witnesses.

WILLIAM M. MURPHY.

Witnesses:
  G. B. OWENS,
  JNO. M. RITTER.